United States Patent
Higashio et al.

(10) Patent No.: US 6,816,852 B1
(45) Date of Patent: Nov. 9, 2004

(54) INFORMATION PROCESSING METHOD, DEVICE AND PROGRAM CONDUCT

(75) Inventors: Kimihiko Higashio, Kobe (JP); Takashi Matsuno, Matsubara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/400,191

(22) Filed: Sep. 21, 1999

(30) Foreign Application Priority Data

Sep. 25, 1998 (JP) .......................................... 10-270441

(51) Int. Cl.⁷ .............................................. G06F 17/30
(52) U.S. Cl. ...................... 707/3; 707/104.1; 345/748
(58) Field of Search ........................... 707/1–5, 9–10, 707/104.1, 200–204, 530; 345/744–748, 594, 595, 589; 358/524, 540, 595

(56) References Cited

U.S. PATENT DOCUMENTS

| | | | | |
|---|---|---|---|---|
| 5,754,697 A | * | 5/1998 | Fu et al. ..................... | 382/232 |
| 5,761,655 A | * | 6/1998 | Hoffman ........................ | 707/4 |
| 5,915,038 A | * | 6/1999 | Abdel-Mottaleb et al. .. | 382/209 |
| 5,945,982 A | | 8/1999 | Higashio et al. ............... | 707/3 |
| 6,070,167 A | * | 5/2000 | Qian et al. .................. | 707/102 |
| 6,128,102 A | * | 10/2000 | Ota ............................ | 358/403 |
| 6,144,956 A | * | 11/2000 | Yajima et al. ................ | 707/3 |
| 6,327,387 B1 | * | 12/2001 | Naoi et al. ................... | 382/190 |
| 6,389,417 B1 | * | 5/2002 | Shin et al. ..................... | 707/6 |
| 6,400,853 B1 | * | 6/2002 | Shiiyama .................... | 382/305 |
| 6,463,426 B1 | * | 10/2002 | Lipson et al. ................. | 707/3 |

FOREIGN PATENT DOCUMENTS

JP 07-111600 * 4/1995 ............. G03F/3/08

OTHER PUBLICATIONS

Eric Paquet et al., A Content–based Search Engine for VRML Databases, 6/23–25/98, IEEE, 541–546.*

* cited by examiner

Primary Examiner—Shahid Alam
Assistant Examiner—Jean Bolte Fleurantin
(74) Attorney, Agent, or Firm—McDermott Will & Emery LLP

(57) ABSTRACT

Information processing method, device and program product capable of retrieving image data suitable for certain image data as a color scheme by a simple operation, in which (1) a piece of image data is selected as a retrieval criterion from among a plurality of image data stored in a first memory device, (2) a color stored in combination with a feature color of the selected image data is extracted from a second memory device for storing a plurality of two-color combinations suitable as color schemes, and (3) image data having the extracted color as a feature color is extracted from the first memory device as a retrieval result.

16 Claims, 11 Drawing Sheets

FIG.9

COLOR SCHEME DICTIONARY

Red:

| IMAGE | SUITABLE COLOR |
|---|---|
| American | Cobalt blue |
| Christmas | Green |
| : | |
| : | |
| | |
| | |
| | |

Orange:

| IMAGE | SUITABLE COLOR |
|---|---|
| Mediterranean | Rose-red |
| Sporty | Turquoise blue |
| Adult | Violet |
| Chic | Olive-green |
| : | |
| : | |
| | |
| | |

Yellow:

| IMAGE | SUITABLE COLOR |
|---|---|
| Cool | Gray |
| Gentle | Khaki |
| Resort | Blue |
| : | |
| : | |
| | |
| | |
| | |

Green:

| IMAGE | SUITABLE COLOR |
|---|---|
| Splendor | Magenta |
| Christmas | Red |
| : | |
| : | |
| | |
| | |
| | |

Blue:

| IMAGE | SUITABLE COLOR |
|---|---|
| Resort | Yellow |
| Chic | Gray |
| Gentle | Beige |
| : | |
| : | |
| | |
| | |

Violet:

| IMAGE | SUITABLE COLOR |
|---|---|
| Adult | Orange |
| Elegant | Gray |
| : | |
| : | |
| | |
| | |
| | |

200
INFORMATION PROCESSING METHOD, DEVICE AND PROGRAM CONDUCT

This application is based on Japanese Patent Application No. H10-270441 filed in Japan on Sep. 25, 1998, the entire content of which is hereby incorporated by reference.

BACKGROUND OF THE INVENTION

1. Field of the Invention

The present invention relates to an information processing method, device, and program product, and more specifically relates to a method, device, and program product for retrieving image data from a database.

2. Description of the Related Art

Heretofore, database systems have been provided for storing and managing image data.

Generally, in database systems for image data, attribute information such as creation date, file name, file format and the like, and key information such as key words, color and the like are appended to each image data and stored together with the image data.

Normally, the aforesaid attribute information is set automatically by the system. In recent years the key information (specifically color) also can be automatically set through image processing of the image data. In the present specification, color means individual color specified by, for example, hue, lightness, and saturation (HLS space).

The key information is used when retrieving desired image data from among image data stored in a database. For example, when a specific word is specified as a retrieval criterion and retrieval is executed, the image data which have the same word (key word) as the specified word appended as key information are extracted as the retrieval result.

In the aforesaid conventional image data database systems, when attempting to retrieve desired image data using color, that color is specified as a retrieval criterion so as to retrieve image data which have the same color as the specified color or a similar color appended as key information.

In the meantime, color has, in addition to an inherent image, various different images depending on combinations with other colors, i.e., color schemes. Further, color schemes include desirable (compatible) color arrangements, and undesirable color arrangements. For this reason the extraction of image data (expressed in an image) compatible with certain image data (expressed in an image) as a color scheme is considered the purpose of retrieval in image data database systems.

In the conventional image data database systems, however, it is extremely difficult to accomplish such an object retrieval.

OBJECT AND SUMMARY

An object of the present invention is to provide an improved information processing method, device and program product which eliminate the previously described problems.

A further object of the present invention is to provide a method, device, and program product capable of retrieving image data compatible with certain image data as a color scheme by a simple operation.

These objects are attained by providing an information processing method comprising the steps of:

(1) selecting a piece of image data as a retrieval criterion from among a plurality of image data stored in a first memory device;

(2) extracting a color stored in combination with a feature color of the image data selected in the step (1) from a second memory device for storing a plurality of two-color combinations suitable as color schemes; and (3) extracting image data having the color extracted in the step (2) as a feature color from the first memory device as a retrieval result.

In this method, the second memory device may further store images relative to each combination, the step (1) may further include a step of selecting one image among the images stored in the second memory device as a retrieval criterion, and at step (2), a color stored in combination with a feature color of the image data selected in step (1) and corresponding to the image selected in the step (1) is extracted from the second memory device.

In this method, the feature color may be stored appending to image data in the first memory device. Also, the feature color may be automatically extracted from image data when retrieval is executed.

These objects are attained by providing an information processing device comprising:

a first memory device for storing a plurality of image data;

a second memory device for storing a plurality of two-color combinations suitable as color schemes; and a processor for, when a piece of image data is selected as a retrieval criterion from among the plurality of image data stored in the first memory device, extracting from the second memory device a color stored in combination with a feature color of the selected image data and extracting from the first memory device as a retrieval result image data having the color extracted from the second memory device as a feature color.

These objects are further attained by providing a program product executable by a computer for processing information, said program product comprising:

a selection means for selecting a piece of image data as a retrieval criterion from among a plurality of image data stored in a first memory device;

a first extraction means for extracting a color stored in combination with a feature color of image data selected by the selection means from a second memory device for storing a plurality of two-color combinations suitable as color schemes; and a second extraction means for extracting image data having the color extracted by the first extraction means as a feature color from the first memory device as a retrieval result.

BRIEF DESCRIPTION OF THE DRAWINGS

These and other objects and features of the present invention will become clear from the following description taken in conjunction with the preferred embodiments thereof with reference to the accompanying drawings, in which:

FIG. 9 is a conceptual diagram showing an example of the structure of a color scheme dictionary;

DETAILED DESCRIPTION OF THE PREFERRED EMBODIMENTS

A preferred embodiment of the present invention is described hereinafter with reference to the accompanying drawings.

Figure 1:
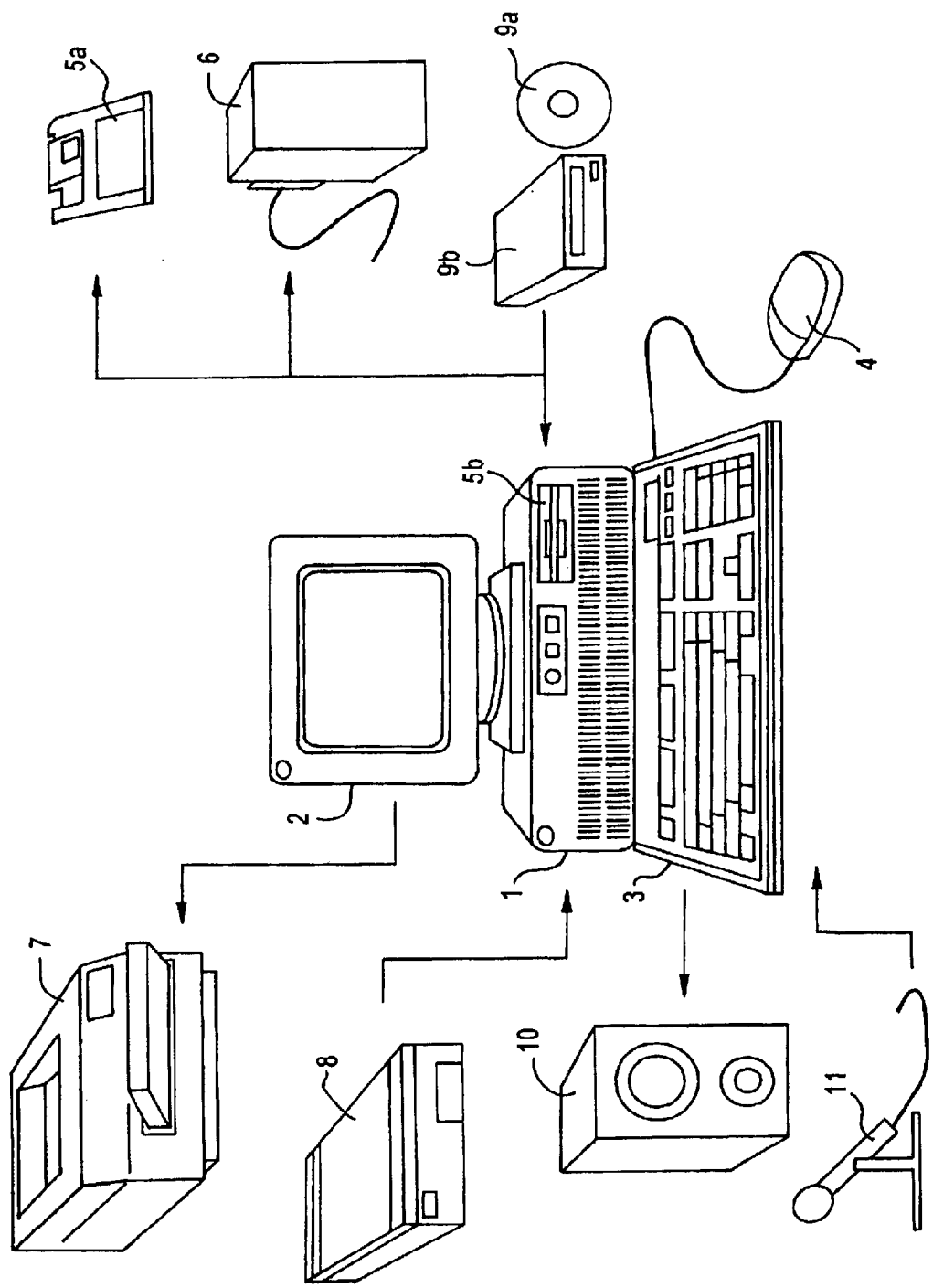
FIG. 1 briefly shows the construction of an information processing device of an embodiment of the present invention.

FIG. 1 briefly shows construction of an information processing device (hereinafter referred to as "the system") of the present embodiment. As shown in FIG. 1, the system is provided with a controller 1 having a central processing unit (hereinafter referred to as "CPU"). The controller 1 controls the entire system, and is connected to the following devices: a display 2 for displaying images or text and displays for operations and the like, a keyboard 3 and a mouse 4 for various types of input and specifying operations, a hard disk 6 for storing data and the like, a printer 7 for printing text and image data, a scanner 8 for inputting image data, a CD-ROM drive 9b for reading data stored on a CD-ROM 9a, a speaker 10 for audio output, and a microphone 11 for audio input.

The controller 1 is provided with a floppy disk drive 5b for writing data and programs on a floppy disk 5a used as a recording medium, and reading data and programs stored on the floppy disk 5a. The floppy disk drive 5b may be provided as a separate unit to the controller 1 as are the other devices.

Figure 2:
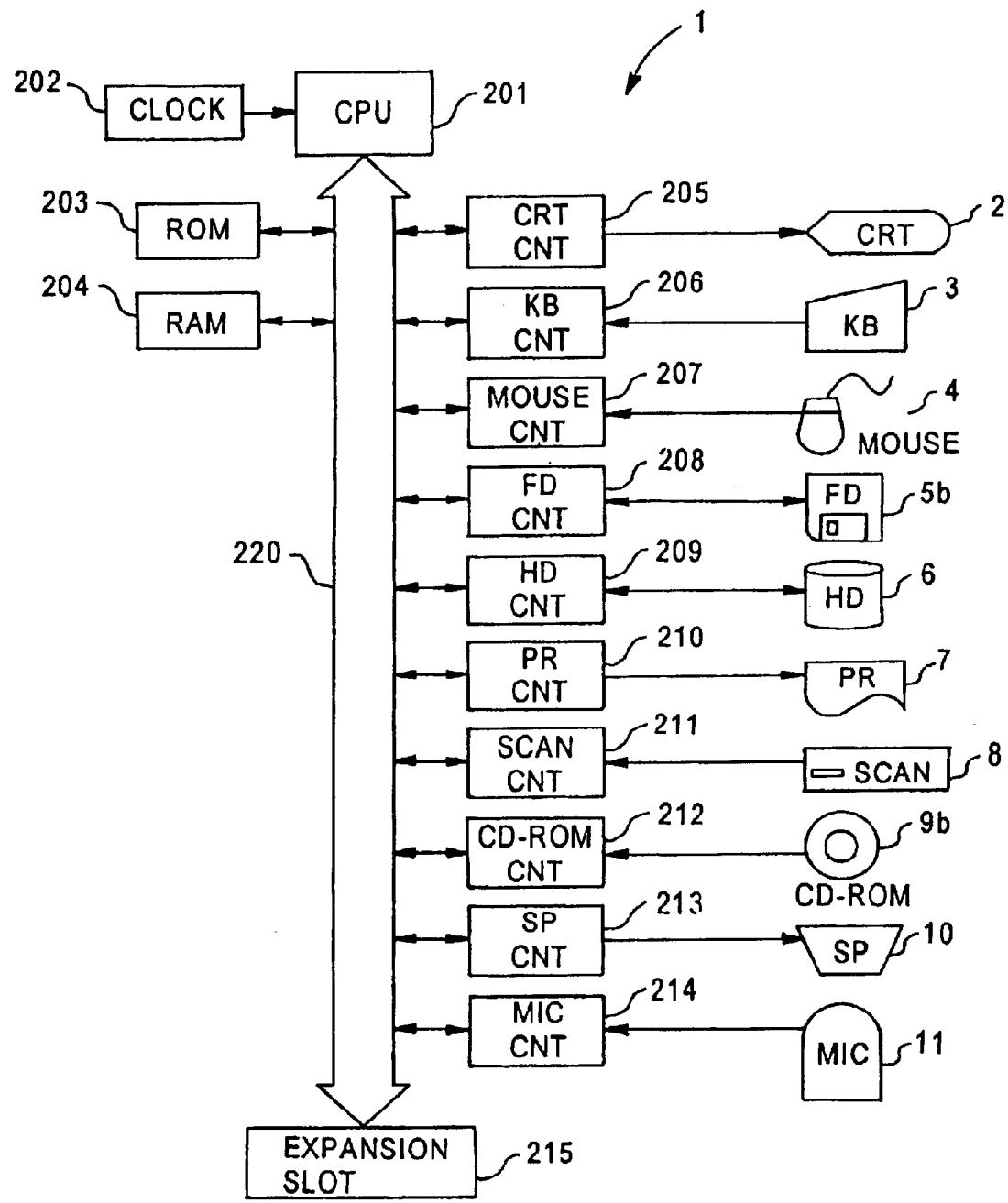
FIG. 2 is a block diagram of the control block of the information processing device of the present embodiment.

FIG. 2 is a block diagram of the entire system. The controller 1 comprises as its core a CPU 201 such as, for example, a Pentium® processor manufactured by Intel, Inc. The CPU 201 is connected via a data bus 220 to a read only memory (ROM) 203 for storing programs controlling the system, and a random access memory (RAM) 204 for temporarily storing data and programs executed for controls by the CPU 201. The CPU 201 is connected via the data bus 220 to the following circuits: a display control circuit 205 for controlling the display 2 and displaying images or text, a keyboard control circuit 206 for controlling transmission of input from the keyboard 3, a mouse control circuit 207 for controlling transmission of input from the mouse 4, a floppy disk drive control circuit 208 for controlling the floppy disk drive 5b, a hard disk drive control circuit 209 for controlling the hard disk drive 6, a printer control circuit 210 for controlling output to the printer 7, a scanner control circuit 211 for controlling the scanner 8, a CD-ROM drive control circuit 212 for controlling the CD-ROM drive 9b, a speaker control circuit 213 for controlling the speaker 10, and a microphone control circuit 214 for controlling the microphone 11.

The CPU 201 is connected to a clock 202 for generating standard clock signals required for system operation. The CPU 201 is connected via the data bus 220 to an expansion slot 215 for connecting various types of expansion boards. A SCSII board may be installed in the expansion slot 215, so as to connect the floppy disk drive 5b, the hard disk drive 6, the scanner 8, and the CD-ROM drive 9b via the SCSII board.

Although the floppy disk 5a and the hard disk 6 are used as recording media of data and the like in the present embodiment, other recording media such as an magneto-optical disk (MO) also may be used. Furthermore, although the scanner 8 is used as an image data input device, other data input devices such as a digital camera (digital still camera), digital video camera and the like also may be used. Although the printer 7 is used as an output device, other output devices such as a digital copier and the like also may be used.

In the present embodiment, image data are input to the hard disk 6 from an external input device such as the scanner 8 and the CD-ROM drive 9b, and the image data stored on the hard disk 6 is managed, but consideration may be given, for example, to direct management of image data stored on an external recording medium such as the CD-ROM 9a or the like. In this instance, index data representing the image data stored on the CD-ROM 9a and key information corresponding to these index data are stored on the hard disk 6 (the set of the index data and key information is referred to as a "record"). During image data retrieval, first, the record is extracted as a retrieval result, and thereafter the image data itself is read from the CD-ROM 9a based on the index data of the extracted record.

The execution of programs in the system of the aforesaid construction is described below.

Figure 3:
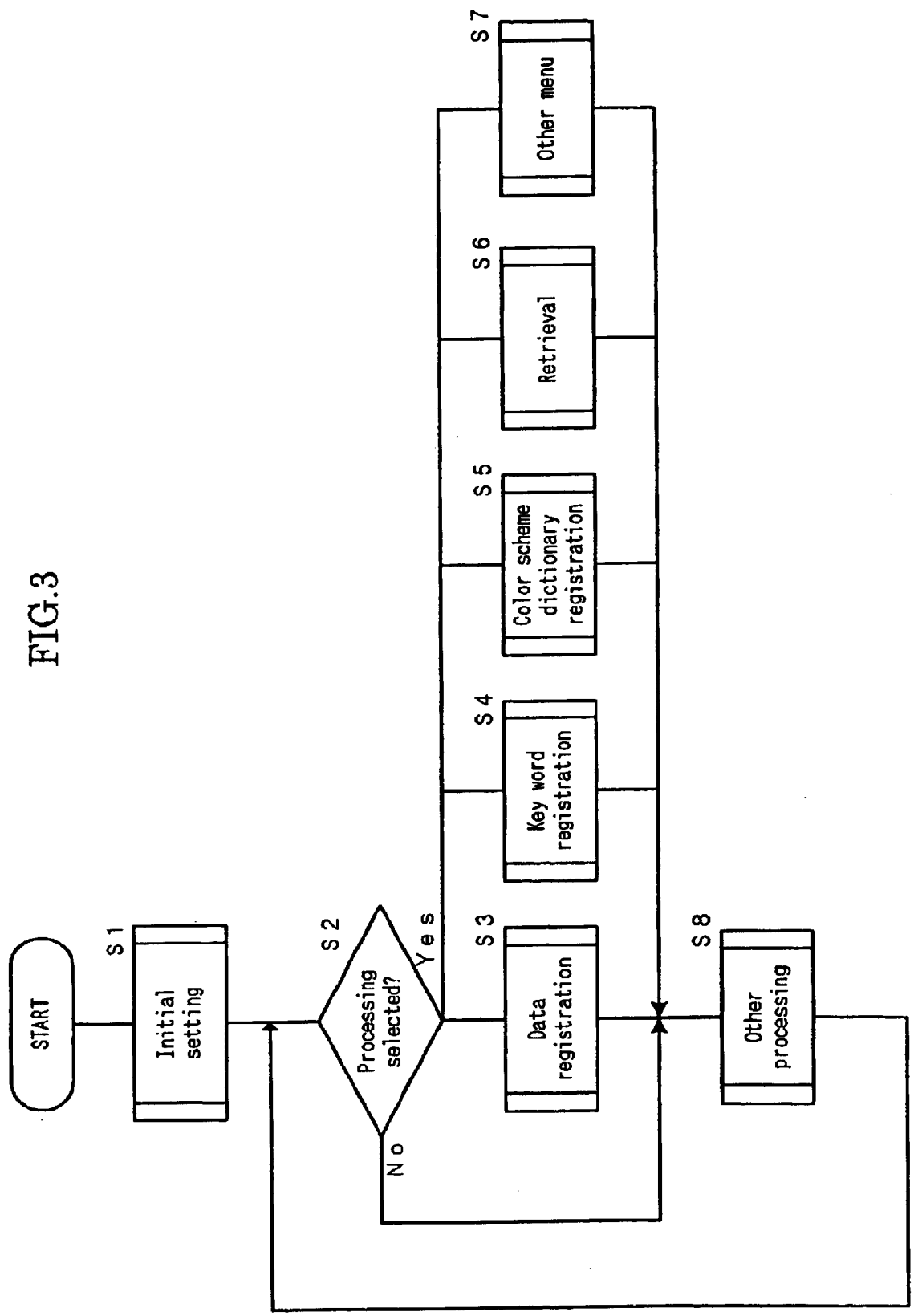
FIG. 3 is a flow chart of main routine of a program executed in the information processing device of the present embodiment.

FIG. 3 is a flow chart of main routine of a program of the present invention executed by the controller 1 (CPU 201). When the program stored in ROM 203 is started in response to turning ON a main power source of the controller 1, in step S1 (hereinafter the word "step" is omitted and simply "S" is used to indicate a step), initialization setting processing, which includes initialization of flags and the like required for each processing below, and display of initial screen (not shown) on the display 2, is executed. Text and icons and the like representing each of the following processing are shown on the initial screen, and desired processing on the initial screen is selected by a user operating the keyboard 3 or the mouse 4.

Then, in S2, a determination is made as to whether or not processing selection has occurred based on specification input from the user. If any processing has been selected in S2, various subroutines including data registering processing (S3), key word registering processing (S4), color scheme dictionary registering processing (S5), retrieval processing (S6), and the other menu processing (S7) are executed in response to the selection, and thereafter the routine continues to the other processing of S8. If no processing has been selected in S2, the routine advances to the other processing of S8 without executing any processing. When the other processing of S8 are completed, the routine returns to S2 and the same processing are subsequently repeated.

Details of the content of the data registering processing (S3), the color scheme dictionary registering processing (S5), and the retrieval processing (S6) are described in detail below. The key word registering processing (S4), the other menu processing (S7), and the other processing (S8) are basically similar to the processing of conventional information processing devices, and are therefore omitted from the following description inasmuch as they are not directly related to the present invention.

Figure 4:
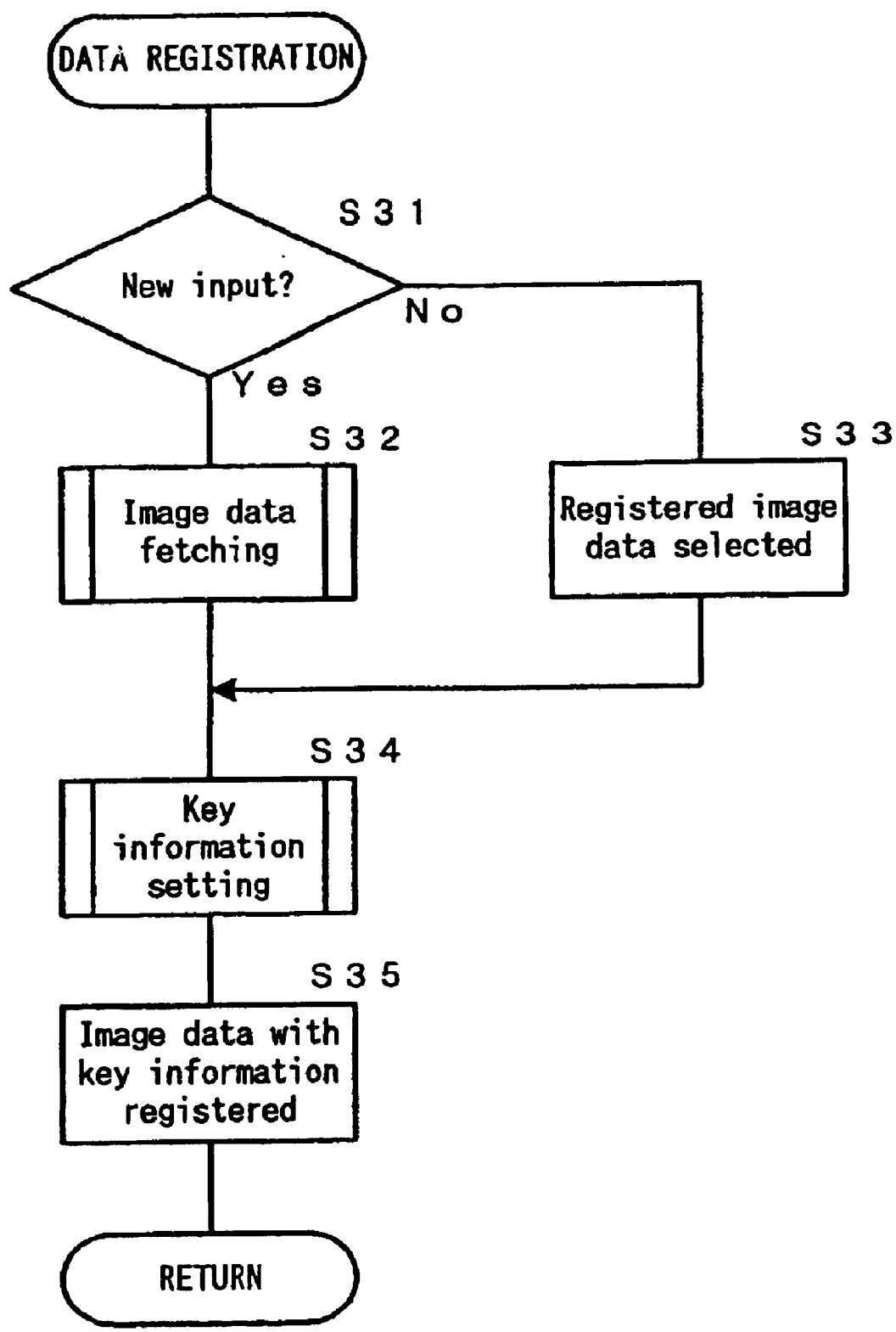
FIG. 4 is a flow chart of data registering processing subroutine.

FIG. 4 is a flow chart showing details of the data registering processing subroutine executed in S3 of the main routine of FIG. 3. When this subroutine is called, first, in S31, a determination is made as to whether or not there is an new input of image data based on the specification input from the user. When there is new input (S31: YES), in S32, image data fetching processing is executed to register (i.e., store on the hard disk 6 functioning as a first memory device) new image data in the database, and thereafter the routine continues to S34. On the other hand, when there is no new input (S31: NO), in S33, a piece of image data is selected from among the image data which has been registered in the database (i.e., stored on the hard disk 6) based on the specification input from the user, and thereafter the routine continues to S34. In S34, key information setting processing is executed to set key information such as color and the like to be appended to the image data. When the key information setting processing ends, the image data newly registered in S32 or the image data selected in S33 and key information set in S34 are mutually associated and registered in the database (i.e., stored on the hard disk 6) (S35), and the routine returns to the main routine.

Figure 5:
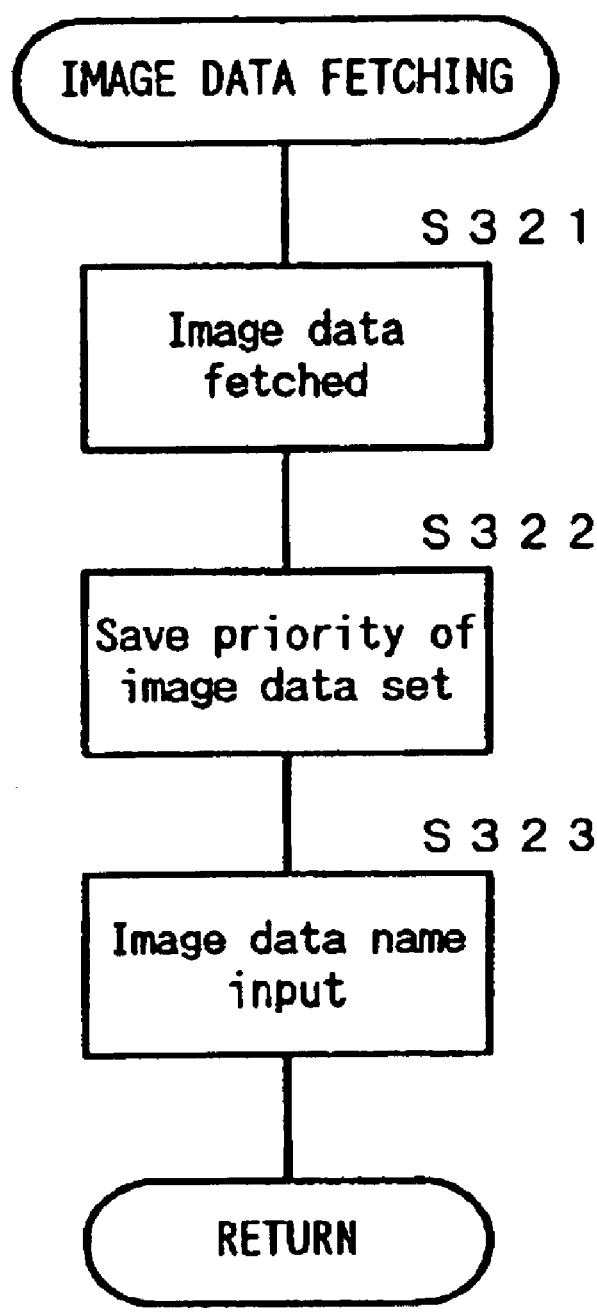
FIG. 5 is a flow chart of image data fetching processing subroutine.

FIG. 5 is a flow chart showing details of the image data fetching processing subroutine executed in S32 of the data registering processing subroutine of FIG. 4. When this subroutine is called, first, processing is executed to fetch image data read by the scanner 8 or the CD-ROM drive 9b to the hard disk 6 (S321). Then, the save priority of the fetched image data is set based on the specification input from the user (S322), and after the image data name is input (S323), the routine returns to the data registering processing subroutine.

Figure 6:
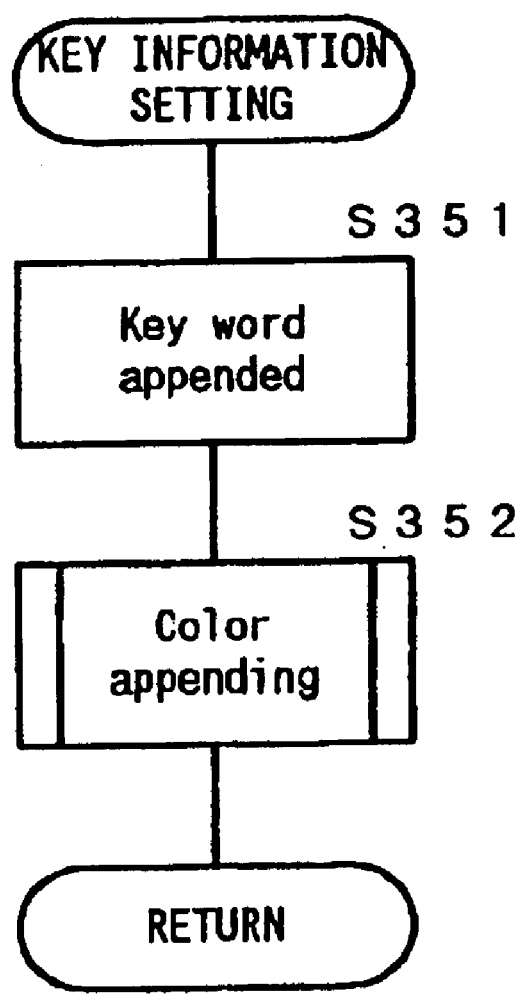
FIG. 6 is a flow chart of key information setting processing subroutine.

FIG. 6 is a flow chart showing details of the key information setting processing subroutine executed in S34 of the data registering processing subroutine of FIG. 4. When this subroutine is called, first, key word appending processing is executed (S351). The key word appending processing is processing similar to the well known key word appending processing, wherein one or more words or sentences are set as a key word(s) based on input from a user, and the set key word is registered together with the image data in the database. Then color appending processing is executed (S352), and thereafter the routine returns to the data registering processing subroutine.

Figure 7:
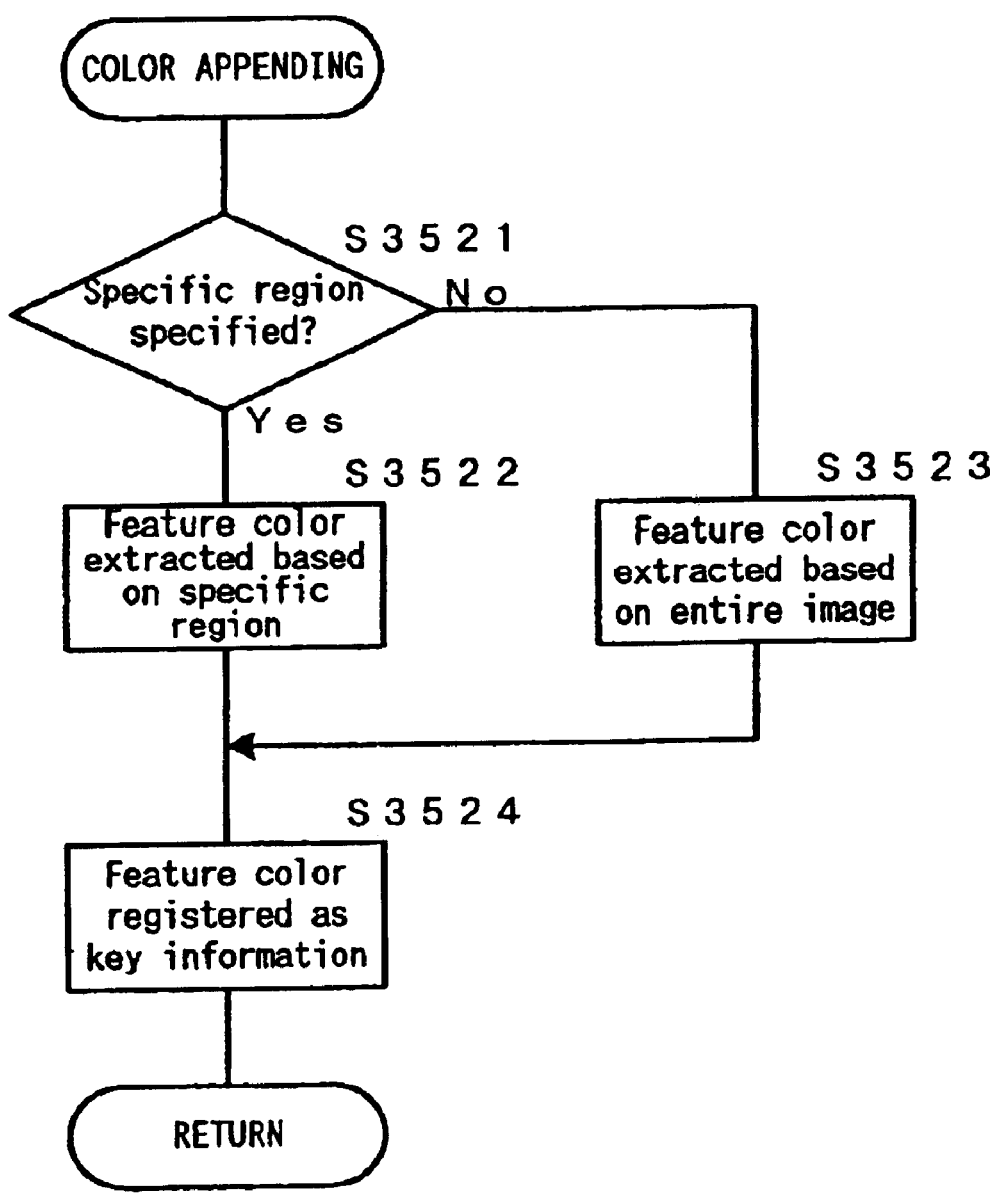
FIG. 7 is a flow chart of color appending processing subroutine.

FIG. 7 is a flow chart showing details of the color appending processing subroutine executed in S352 of the key information setting processing subroutine of FIG. 6. When this subroutine is called, first, a determination is made as to whether or not a specific region of image, which is displayed on the screen of the display 2 based on the image data specified by the user, is specified (S3521). The region specifying method may include, for example, specifying numeric values (e.g., coordinates) using the keyboard 3, or specifying the region on the screen using the mouse 4. If a specific region has been specified (S3521: YES), then a feature color of the image is automatically extracted based on the image data corresponding to the specified region, and thereafter the routine advances to S3524. On the other hand, when a specific region has not been specified (S3521: NO), the feature color is automatically extracted based on the image data of the entire image, and thereafter the routine advances to S3524. The feature color may be, for example, the color having the highest frequency of appearance in the image. In S3524, the feature color extracted in S3522 or S3523 is set as key information, and the set color is registered in the database together with the image data (S3524), and thereafter the routine returns to the key information setting processing subroutine.

Figure 8:
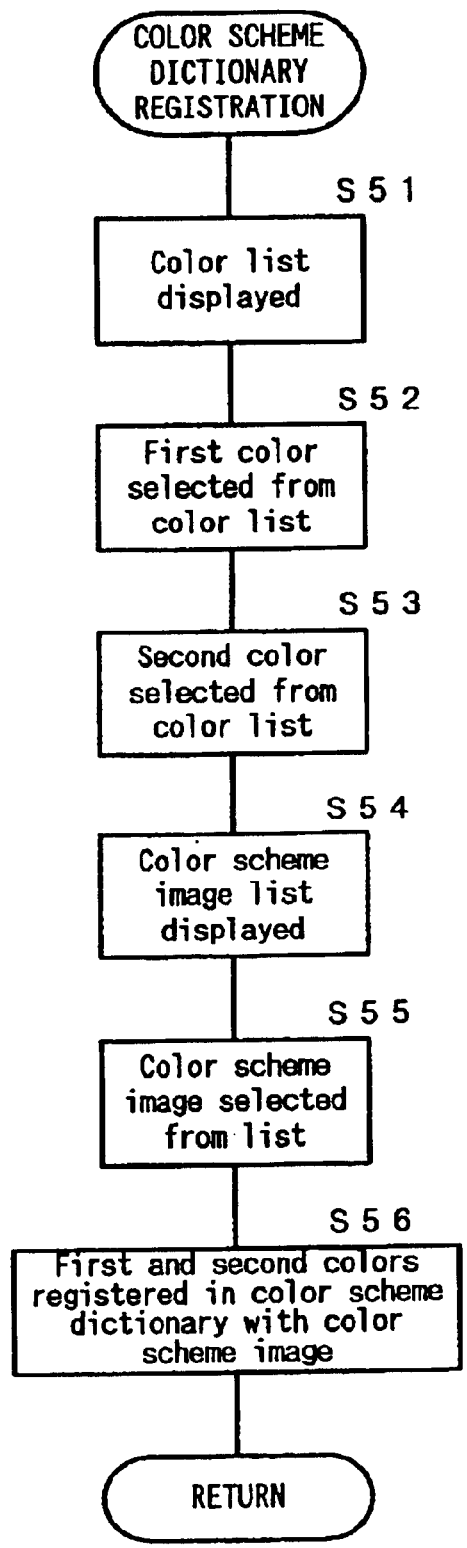
FIG. 8 is a flow chart of color scheme dictionary registering processing subroutine.

FIG. 8 is a flow chart showing details of the color scheme dictionary registering processing subroutine executed in S5 of the main routine of FIG. 3. The structure of the color scheme dictionary is first described to facilitate understanding of the content of this subroutine.

FIG. 9 is a conceptual drawing showing an example of the structure of the color scheme dictionary. The color scheme dictionary comprises colors, other colors suitable for color schemes with the aforesaid colors, and color scheme images relative to the color schemes (combinations). For example, regarding the color red, cobalt blue and green are registered as suitable color schemes. Furthermore, a color scheme image called "American" is registered relative to the color scheme (combination) of red and cobalt blue, and a color scheme image called "Christmas" is registered relative to the color scheme (combination) of red and green. Similarly, relative to various colors, colors suitable as color schemes and color scheme images relative to the color schemes are registered. The color scheme dictionary is stored on a recording medium such as the hard disk 6 which functions as a second memory device.

Returning now to FIG. 8, When the color scheme dictionary registering processing subroutine is called, first, in S51, a color list is displayed on the screen of the display 2. Although the color list comprises images of pre-registered colors in a tiled array, the color list may be a color wheel, or data representing each color may be displayed as text or numbers. More simply still, the color list may be displayed as the name of each color in text. Then, according to the specification input from the user, a first color and a second color different from the first color are selected from the color list as colors to be registered in the color scheme dictionary (S52 and S53). When color selection ends, the color scheme image list is displayed on the screen of the display 2 (S54). The term color scheme image is a word expressing an image corresponding to a color scheme (i.e., a combination of two colors), and the color scheme image list is a list listing these words (text). A user selects a color scheme image suitable for combinations, i.e., the color scheme of the first and second colors selected in S52 and S53 from the color scheme image list displayed on the display 2 and inputs this selection via the keyboard 3 or the mouse 4 (S55). When a color scheme image is selected based on this input, the first and second colors selected in S52 and S53 are registered in the color scheme dictionary as color schemes suitable to the selected color scheme image (S56), and thereafter the routine returns to the main routine. In the present embodiment, the color scheme image list is displayed so as to allow selection of a color scheme image from among those displayed, however, a user may directly input text via the keyboard 3 so as to input a color scheme image.

Figure 10:
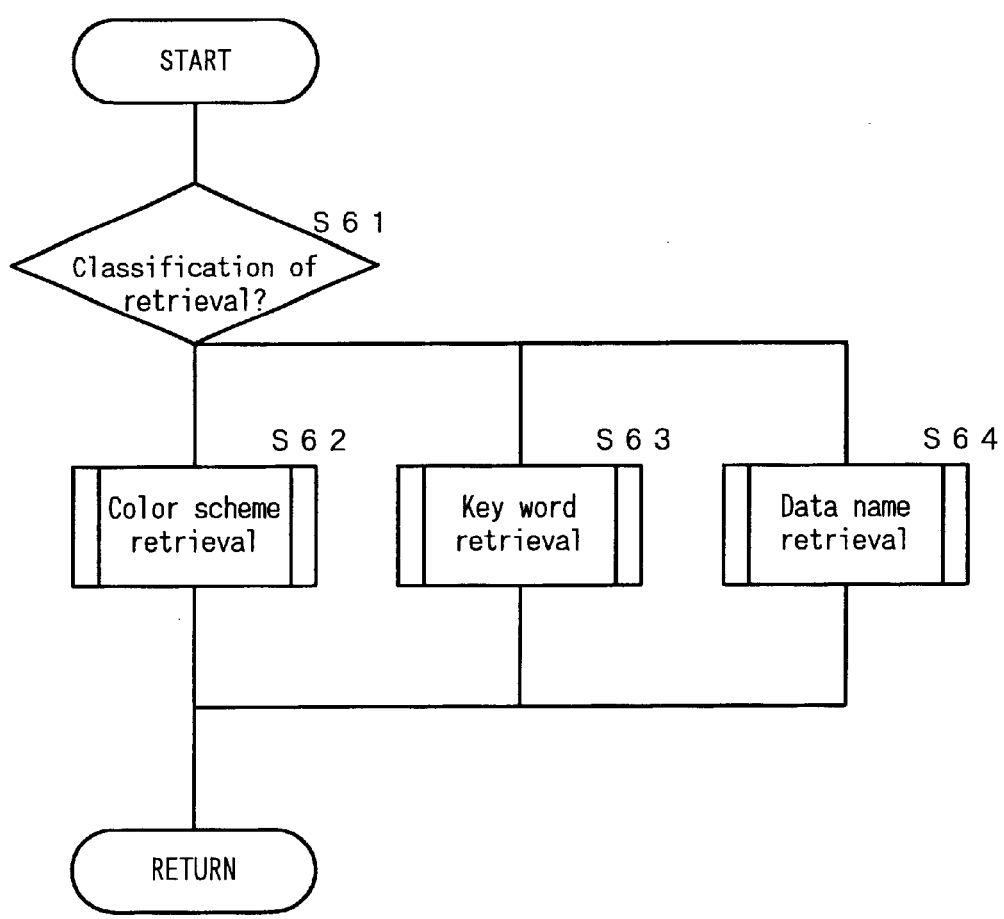
FIG. 10 is a flow chart of retrieval processing subroutine.

FIG. 10 is a flow chart showing details of the retrieval processing subroutine executed in S6 of the main routine of FIG. 3. When this subroutine is called, first, a determination is made as to whether or not the retrieval classification is color scheme retrieval, key word retrieval, or data name retrieval (S61), and in response to the determination the routine advances to either S62, S63, or S64, then after each retrieval processing subroutine has been executed, the routine returns to the main routine. The key word retrieval processing (S63) and the data name retrieval processing (S64) are processing for specifying a key word or data name as a retrieval criterion and retrieving image data having key word or data name that match the specified key word or data name, and are basically similar to the processing of conventional information processing devices, and are therefore omitted from the following description inasmuch as they are not directly related to the present invention.

Figure 11:
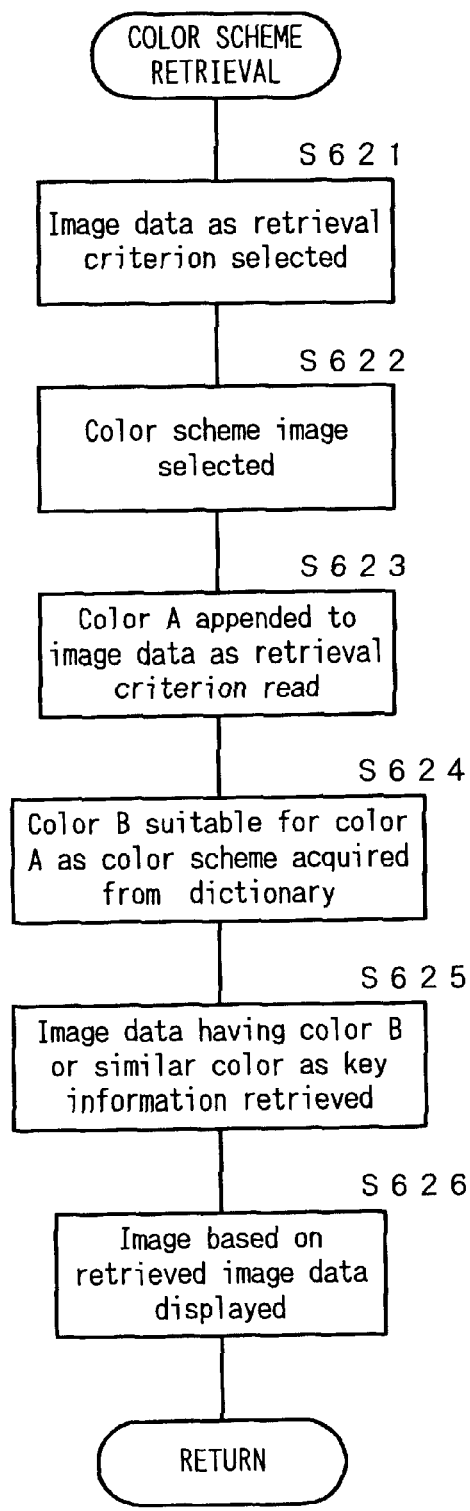
FIG. 11 is a flow chart of color scheme retrieval processing subroutine.

FIG. 11 is a flow chart showing details of the color scheme retrieval processing subroutine executed in S62 of the retrieval processing subroutine of FIG. 10. In this subroutine, when a piece of image data is selected from the database based on the specification input by a user as the retrieval criterion (S621) and a color scheme image is selected (S622), a color A appended to the image data selected in S621 as key information is read from the hard disk 6 (S623), and a color B is acquired from the color scheme dictionary as suitable for a color scheme with the color A in the color scheme image selected in S622 (S624). Image data having the same color as the color B or a similar color appended as key information are retrieved from the database (S625), and images are displayed on the screen of the display 2 as a retrieval result based on the image data (S626), and thereafter the routine returns to the retrieval processing subroutine.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

For example, although color as key information of each image data is registered beforehand in a database in the previously described embodiment, a feature color may be automatically extracted from each image data each time the retrieval processing is executed. Specifically, the color appending processing subroutine of S352 is omitted from the key information setting processing subroutine of FIG. 6, processing for automatically extracting a feature color (the color A) from the image data selected in S621 is substituted for the processing of S623, and in the color scheme retrieval processing subroutine, processing for automatically extracting a feature color from each image data registered in the database and retrieving image data having the same color as the color B or a similar color as the feature color is substituted for the processing of S625.

In the aforesaid embodiment, images are displayed as a retrieval result, but it is also possible to use another display method such as displaying the data name of the image data or the like.

In the aforesaid embodiment, a color scheme image is also specified as a retrieval criterion in addition to the image data, but it is also possible to execute retrieval using only the image data as a retrieval criterion.

Although the program of the present invention is stored in the ROM 203 in the aforesaid embodiment, all or part of the program may be stored beforehand on a recording medium such as the floppy disk 5a or the CD-ROM 9b, such that the controller 1 reads the program and the data together from the recording medium and executes the program.

The method, device, and program product for processing information of the present invention provides a simple operation for specifying only desired image data so as to allow retrieval of image data suitable as color schemes with the desired image data. Accordingly, the present invention provides excellent operating characteristics because a user need not specify a retrieval key such as a key word or color or the like, nor is it necessary to consider the suitability of a color scheme.

What is claimed is:

1. A method in an information processing device for retrieving an image data, the method comprising the steps of:

(1) receiving an instruction to select an image data as a retrieval criterion from among a plurality of image data stored in a first memory device;

(2) extracting a color from a second memory device for storing a plurality of two-color combinations suitable as color schemes, wherein the extracted color and a feature color of the image data selected at the step (1) comprise one of the two-color combinations; and (3) extracting one or more image data, a feature color of which corresponds to the color extracted at the step (2), from the first memory device as a retrieval result.

2. A method as claimed in claim 1, wherein the second memory device further stores a plurality of keys which respectively represent imagery of a corresponding two-color combination, the step (1) further includes a step of receiving an instruction to select one key among the plurality of keys stored in the second memory device as a retrieval criterion, and said one of the two-color combinations at the step (2) has the selected key.

3. A method as claimed in claim 1, wherein said first memory device stores a plurality of colors representing feature colors of the plurality of image data.

4. A method as claimed in claim 1, further comprising a step of extracting a feature color from an image data.

5. An information processing device for retrieving an image data comprising:

a first memory device for storing a plurality of image data;

a second memory device for storing a plurality of two-color combinations suitable as color schemes; and a processor for, when an instruction is received to select an image data as a retrieval criterion from among the plurality of image data stored in the first memory device, extracting from the second memory device a color which comprises one of the two-color combinations with a feature color of the selected image data, and for extracting from the first memory device as a retrieval result one or more image data a feature color of which corresponds to the color extracted from the second memory device.

6. An information processing device as claimed in claim 5, wherein the second memory device further stores a plurality of keys which respectively represent imagery of a corresponding two-color combination, and wherein the processor, when an instruction is received to select an image data among the plurality of image data stored in the first memory device and one key among the plurality of keys stored in the second memory device as a retrieval criterion, extracts from the second memory device a color, which comprises one of the two-color combinations having the selected key with a feature color of the selected image data, and extracts from the first memory device as a retrieval result one or more image data a feature color of which corresponds to the color extracted from the second memory device.

7. An information processing device as claimed in claim 5, wherein said first memory device stores a plurality of colors representing feature colors of the plurality of image data.

8. An information processing device as claimed in claim 5, wherein said processor extracts a feature color from an image data.

9. A program for retrieving an image data, said program causes a computer to execute a processing comprising the steps of:

(1) receiving an instruction to select an image data as a retrieval criterion from among a plurality of image data stored in a first memory device;

(2) extracting a color from a second memory device for storing a plurality of two-color combinations suitable as color schemes, wherein the extracted color and a feature color of the image data selected at the step (1) comprise one of the two-color combinations; and (3) extracting one or more image data, a feature color of which corresponds to the color extracted at the step (2), from the first memory device as a retrieval result.

10. A program as claimed in claim 9, wherein the second memory device further stores a plurality of keys which respectively represent imagery of a corresponding two-color combination, the step (1) further includes a step of receiving an instruction to select one key among the plurality of keys stored in the second memory device as a retrieval criterion, and said one of the two-color combinations at the step (2) has the selected key.

11. A program as claimed in claim 9, wherein said first memory device stores a plurality of colors representing feature colors of the plurality of image data.

12. A program as claimed in claim 9, wherein said processing further includes a step of extracting a feature color from an image data.

13. A program product executable by a computer for processing information, the program product comprising a medium storing instructions directing the computer to carry out the steps of:

(1) receiving an instruction to select an image data as a retrieval criterion from among a plurality of image data stored in a first memory device;

(2) extracting a color from a second memory device for storing a plurality of two-color combinations suitable as color schemes, wherein the extracted color and a feature color of the image data selected at the step (1) comprise one of the two-color combinations; and (3) extracting one or more image data, a feature color of which corresponds to the color extracted at the step (2), from the first memory device as a retrieval result.

14. A program product as claimed in claim 13, wherein the second memory device further stores a plurality of keys which respectively represent imagery of a corresponding two-color combination, the step (1) further includes a step of receiving an instruction to select one key among the plurality of keys stored in the second memory device as a retrieval criterion, and said one of the two-color combinations at the step (2) has the selected key.

15. A program product as claimed in claim 13, wherein said first memory device stores a plurality of colors representing feature colors of the plurality of image data.

16. A program product as claimed in claim 13, wherein said instructions further includes a step of extracting a feature color from an image data.

* * * * *